United States Patent [19]

Fusi et al.

[11] Patent Number: 5,352,279
[45] Date of Patent: Oct. 4, 1994

[54] WASHABLE PAVEMENT CHALK COMPOSITION

[75] Inventors: John C. Fusi, New Providence; Cynthia A. Gale, High Bridge, both of N.J.; Frank M. Young, Excelsior, Minn.

[73] Assignee: Rapid Mounting & Finishing Co.-Cadaco Division, Chicago, Ill.

[21] Appl. No.: 190,313

[22] Filed: Feb. 2, 1994

[51] Int. Cl.5 ............................................. C09D 11/00
[52] U.S. Cl. ................................. 106/19 B; 106/19 C; 106/25 R
[58] Field of Search ................... 106/19 B, 19 C, 25 R

[56] References Cited

U.S. PATENT DOCUMENTS

| 91,090 | 6/1869 | Compton | 106/19 B |
|---|---|---|---|
| 1,094,360 | 4/1914 | Beckers | 106/19 B |
| 1,131,432 | 3/1915 | Smith | 106/19 B |
| 3,704,158 | 11/1972 | Rohan | 117/100 |
| 4,617,058 | 10/1986 | Lee | 106/19 |

FOREIGN PATENT DOCUMENTS

| 2444557 | 4/1976 | Fed. Rep. of Germany . |
|---|---|---|
| 57-55977 | 4/1982 | Japan . |
| 62-288673 | 12/1987 | Japan . |
| 1-203484 | 8/1989 | Japan . |
| WO85/03082 | 7/1985 | PCT Int'l Appl. . |
| 711076 | 1/1980 | U.S.S.R. . |

Primary Examiner—Karl Group
Assistant Examiner—Chris Gallo
Attorney, Agent, or Firm—Willian Brinks Hofer Gilson & Lione

[57] ABSTRACT

A washable pavement chalk composition comprises a particulate such as powdered calcium carbonate and a binder such as rice starch. The composition is used in a liquid form, therefore preferably also comprising water. One or more colorants may be used in the composition to provide different colored compositions.

19 Claims, No Drawings

WASHABLE PAVEMENT CHALK COMPOSITION

BACKGROUND OF THE INVENTION

The present invention relates to a washable pavement chalk composition, particularly a composition that can be applied in liquid form.

Sidewalk chalk in stick form has been known for some time. In one well known format, the chalk comes in a package of several sticks, each of a different color. Some sidewalk chalk is advertised as washable, implying that it will wash off of pavement by rain or an equivalent low-pressure water stream, without the need for any scrubbing or abrasive action.

Artists, particularly young children, greatly enjoy making drawings on the pavement with such chalk. Since the chalk is washable, parents like the chalk because no permanent marks are left on the pavement and no clean up is required after the sidewalk chalk artist is finished.

One drawback to sidewalk chalk is that it is limited to a solid, stick format, which limits its application to drawing, primarily by hand. Artistic expression and the types of drawings thus created are therefore limited. If sidewalk chalk came in a liquid form, it would allow for a new and more interesting way of creating chalk drawings on pavement, such as by brushing or preferably spraying. It would be a great improvement if a liquid composition could be used to create washable chalk artistic works on pavement.

SUMMARY OF THE INVENTION

A washable pavement chalk composition has been invented that can be applied in liquid form. The composition includes a particulate and a water soluble binder, and preferably a colorant. In one preferred embodiment, the particulate is powdered calcium carbonate and the binder is a starch, preferably rice starch. Other aspects of the invention include methods of preparing the washable pavement chalk composition and methods of using it.

The composition can be made of water and other non-toxic materials so that it is safe for children to play with. The composition can be colored with a variety of colors. The binder helps the particulate to adhere to the pavement once the water evaporates, leaving a chalk drawing or picture that adheres to the pavement until washed off by rain or a low-pressure water stream. The composition and its method of use allow sidewalk chalk artists to express their artistic talent in new ways and create unique artistic works.

DETAILED DESCRIPTION OF THE PRESENTLY PREFERRED EMBODIMENTS

Unless otherwise specified, all percentages herein are given in weight percent.

The composition of the present invention can be supplied in a dry form that is mixed with water by the user, or it is preferably supplied in a premixed liquid form. In its premixed form, the liquid is preferably water because it is non-toxic, plentiful and inexpensive. In a dry form, the composition will preferably be in a mixture of powders to aid in its solution and dispersion in water. The composition preferably includes powdered calcium carbonate as the dispersed particulate and rice starch as the soluble binder.

The calcium carbonate powder provides a pigment to the composition which reflects light and thus acts as the main visual component of the composition. Other particulates that could be used include titanium dioxide, calcium oxide, calcium sulfate and combinations thereof. Calcium carbonate is a preferred particulate because it is fairly opaque, is reasonably suspendable in water and was found to wash off of pavement fairly easily.

Since the composition is to be applied in liquid form, it is preferable that the particulate remain suspended when the composition is in its liquid form. Also, since the preferred method of application is by spraying, the particulate should not plug up a spray nozzle. A small particle size for the particulate is beneficial both for avoiding plugging and for keeping the particulate suspended.

The particulate will preferably have a mean particle size of less than two microns, and more preferably less than one micron. Also, the particle size distribution of the preferred particulate will have at least 80% of the powder particles with an equivalent spherical diameter of less than two microns.

A preferred powdered calcium carbonate may be obtained from the Mississippi Lime Company, Alton, Ill. 62002, and St. Genevieve, Mo. 63670. Mississippi M60 (Extra Light) Precipitated Calcium Carbonate is preferred. It is reported to have a mean particle size (sedigraph) of 0.9 microns, a BET surface are of 12.0 $m^2/g$, a 325 mesh residue of 0.01% and a particle size distribution approximately as follows:

| Equivalent Spherical Diameter (microns) | Mass Percent |
| --- | --- |
| less than 0.5 | 25 |
| 0.5–1 | 31 |
| 1–2 | 26 |
| 2–10 | 13 |

Mississippi HO-M60 Milled Precipitated Calcium Carbonate is also suitable. It is reported to have a mean particle size (sedigraph) of 0.9 microns, a BET surface area of 10.0 $m^2/g$, a 325 mesh residue of 0.01% and a particle size distribution approximately as follows:

| Equivalent Spherical Diameter (microns) | Mass Percent |
| --- | --- |
| less than 0.5 | 20 |
| 0.5–1 | 30 |
| 1–2 | 35 |
| 2–10 | 5 |

Other preferred calcium carbonates include Cat. #131-8245 from Eastman Kodak Chemicals, 1001 Lee Road, Rochester, N.Y. 14652-3512 and Calcium Carbonate, Technical from City Chemical Corp., Jersey City, N.J.

The water soluble binder acts to hold the particulate to the pavement after the water evaporates. While other binders may work, starch, and particularly rice starch, has been found to be particularly useful for the composition. Rice starch is the starch obtained from the husk of rice. Rice starch was found to form a good bond between the particulate, calcium carbonate, and different pavement materials tested, including concrete, asphalt and brick. In fact, rice starch was found to bind calcium carbonate particles to aluminum foil. Rice starch not only minimizes ruboff of particulate from the pavement, but it is readily soluble in cold water. This helps in preparing the liquid composition, but more importantly, makes the pavement chalk composition washable. It has been found that the composition with rice starch readily washes off all three types of pavements tested by running cold water over the dried composition. An adult placing a finger over the end of a garden hose attached to a culinary water supply of typical water pressure (about 40 psi) can create a low velocity stream of water that will easily wash off drawings and pictures made using the present invention.

The preferred rice starch is available from Rhône-Poulence, Prospect Plains Road, Cranbury, N.J. 08512-7500, Product No. CN7500. Other starch materials that may also work as suitable binders include corn starch, tapioca starch, potato starch and wheat starch.

The ratio of particulate to binder in the composition of the present invention will preferably be in the range of between about 10:1 and about 1:1. More preferably, the ratio of particulate to binder will be in the range of between about 8:1 and about 4:1. Most preferably the ratio of particulate to binder will be about 6:1.

Where colors other than white (or the natural color of the particulate) are desired for the washable pavement chalk of the present invention, one or more colorants may be added to the composition. One of the advantages of supplying the composition in liquid form is that it can be prepared using liquid colorants. The level of colorant used in the composition will vary depending on the type of colorant and the intensity of the color desired in the dried chalk drawing. In a preferred composition, the colorant will typically comprise about 5% to about 20%, on a dry basis, of the composition. The binder will also comprise about 5% to about 20% of the composition, on a dry basis, and the particulate will comprise about 60% to about 90%, on a dry basis, of the composition.

A preferred colorant is a fluorescent color dispersion such as the WAX series (water dispersed, Type AX), WT series (water dispersed, Type T), or WGT Series (water dispersed, Type GT) from Day-Glo Color, 4515 St. Clair Avenue, Cleveland, Ohio 44103. Examples of these types of aqueous color dispersions are: Green WAX-18 and Green WT-18, Blue WT-19, Blaze Orange WAX-15-N, Saturn Yellow WAX 17-N and Aurora Pink WAX-1. While use of water dispersed colorants is preferred, dry colorants may also be used. Such colorants include Day-Glo powdered colorants such as Rocket Red AX-13-5 and Horizon Blue AX-19.

An alternative supplier of acceptable dry powdered colorants is Magruder Color Company, Radiant Color Division, 2800 Radiant Avenue, Richmond, Calif. 4804. Some preferred Magruder colorants are Radiant Green #T1-Gr-611, Radiant Purple #T1-Pr-4194, Radiant Orange #T1-0g-6613 and Radiant Chartreuse #T1-Ch-6610.

When mixed into a liquid form, the composition will preferably have a solid: water ratio of between about 1:5 and about 2:3, and more preferably between about 1:4 and about 1:2. Most preferably the solids: water ratio will be about 1:3.

Other materials may be added to the composition for desired purposes. Even though the composition is preferably non-toxic, a bittering agent, such as Bitrex EA (21.45% w/v) from B.L. Chemicals, Henley Division, 50 Chestnut Ridge Road, Montvale, N.J. 07645, may be included to make the composition very bitter to the taste so as to discourage small children from ingesting the material. Where the composition is to be supplied in liquid form and may be stored for some time prior to use, such as during normal commercial distribution, an antimicrobial preservative, such as Ucarcide 225 from Union Carbide, may be added. Also a wetting agent such as Dupanol ME from DuPont Organic Chemicals Division, Wilmington, Delaware, may be added to help disperse the ingredients and make washing the dried composition from the pavement easier.

A preferred method of preparing the composition is to premix the powdered ingredients, such as by dry tumbling, then add the powdered ingredients to water in a mixing vessel with adequate stirring. The bittering agent, colorant dispersion and antimicrobial agent, if used, are then sequentially added, with mixing between each step. Preferably, the composition will be prepared by mixing about 4 to about 8 parts powdered calcium carbonate, about 0.5 to about 1.5 parts rice starch and about 15 to about 30 parts water together to form the washable pavement chalk composition. Where a colorant is to be used, it will preferably be mixed with the above components at a level of about 0.1 to about 2 parts colorant. If the composition is to be produced and distributed in a dry form, any colorant used will need to be dry. Alternative, the material may be made in a concentrated form, and additional water added later.

The liquid composition may be applied in any convenient form, such as by brush or spraying. Preferably the composition will be loaded into a hand operated pump-type spray bottle with an adjustable nozzle to provide different types of spray patterns (stream, wide angle, etc.). Such spray bottles are commonly available and are thus not described further. In such spray bottles, a tube extends from the pump to the bottom of the bottle so that fluid is drawn off the bottom of the bottle. For this reason, it is preferable that the particulate material remain dispersed and not form a sediment in the bottom of the spray bottle.

Of course, other types of spray equipment could be used. For example, the composition could be applied using a squirt gun, including the air pump variety of squirt gun such as the Super Soaker TM brand squirt gun. The liquid composition could be contained in a belt pack, with different colors in different compartments, a battery powered pump and a switching mechanism to feed into a tube leading to a hand held spraying apparatus. Of course, different colors may be mixed prior to or after being sprayed to get different shades and colors than those supplied.

Instead of water or air pressure being used to force out a stream of the composition, compressed air could draw out some of the composition as the air flows past an orifice. In this regard, a device similar to the Colorblaster © drawing system from Kenner ® division of Hasbro, Inc., Pawtucket R.I. 02662 could be used.

An activity book with instructions, sample drawing ideas, stencils and the like may be provided with the composition and a spray applicator to increase the play value of the product.

The following examples provide particularly preferred compositions:

EXAMPLE 1

| | Parts by Weight |
|---|---|
| Calcium Carbonate, Type M60 Extra | 56.00 |

-continued

|  | Parts by Weight |
| --- | --- |
| Light Rice Starch | 9.33 |
| Fluorescent Color Dispersion Type WAX | 9.33 |
| Water (pH adjusted to 7.0–8.0 range) | 207.00 |
| Ucarcide 225 | 1.25 |
| Bitrex EA (21.45% w/v) | 0.015 |

EXAMPLE 2 (White)

|  | Parts by Weight |
| --- | --- |
| Calcium Carbonate, Light (USP) | 12.0 |
| Rice Starch | 2.0 |
| Water | 55.0 |

EXAMPLES 3–8 (Color)

The composition of Example 2 is repeated with the addition of 1.0 part by weight of one of the following colorants:
Magruder Radiant Green #T1-Gr-611
Magruder Radiant Purple #T1-Pu-4191
Magruder Radiant Orange #T1-Og-6613
Magruder Radiant Chartreuse #T1-Ch-6610
Day-Glo Rocket Red #AX-13-5
Day-Glo Horizon Blue #AX-19

EXAMPLE 9 (Dry Composition)

|  | Percent by Weight |
| --- | --- |
| Calcium Carbonate (Eastman Kodak) | 85.11 |
| Rice Starch | 14.18 |
| Dupanol ME | 0.17 |

The dry composition of Example 9 can be mixed at a level of 70 gm powder in 7 fluid ounces of water.

The compositions described above are nontoxic and meet appropriate industry and government standards for toy safety.

The compositions and methods of the preferred embodiments provide a washable pavement chalk composition that is fun to apply, makes interesting and artistic drawings, dries to a durable final chalk drawing and then easily washes off of the pavement with rain or a low-pressure stream of water.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A washable pavement chalk composition comprising:
   a) powdered calcium carbonate and
   b) rice starch.
2. The washable pavement chalk composition of claim 1 further comprising a colorant.
3. The washable pavement chalk composition of claim 1 wherein the ratio of calcium carbonate to starch is in the range of between about 8:1 and about 4:1.
4. The washable pavement chalk composition of claim 1 wherein the ratio of calcium carbonate to starch is about 6:1.
5. The washable pavement chalk composition of claim 1 further comprising water.
6. The washable pavement chalk composition of claim 5 further comprising an antimicrobial preservative.
7. The washable pavement chalk composition of claim 5 further comprising a bittering agent.
8. The washable pavement chalk composition of claim 1 wherein the powdered calcium carbonate has a mean particle size of less than about two microns.
9. The washable pavement chalk composition of claim 1 wherein the powdered calcium carbonate has a particle size such that at least 80% of the powder particles have an equivalent spherical diameter of less than two microns.
10. The washable pavement chalk composition of claim 1 wherein the powdered calcium carbonate has a mean particle size of less than about one micron.
11. The washable pavement chalk composition of claim 1 wherein the composition, on a dry basis, comprises:
    a) about 60% to about 90% powdered calcium carbonate;
    b) about 5% to about 20% rice starch; and
    c) about 5% to about 20% colorant.
12. A method of using rice starch and calcium carbonate to prepare a washable pavement chalk composition comprising the steps of mixing:
    a) about 4 to about 8 parts powdered calcium carbonate;
    b) about 0.5 to about 1.5 parts rice starch; and
    c) about 15 to about 30 parts water together to form a washable pavement chalk composition.
13. The method of claim 12 wherein the rice starch is provided in a powdered form and is blended with the powdered calcium carbonate before being mixed with the water.
14. The method of claim 12 further comprising mixing about 0.1 to about 2.0 parts colorant into the washable pavement chalk composition.
15. The method of claim 14 wherein the colorant is provided in a liquid form.
16. A method of using a washable pavement chalk composition comprising the steps of:
    a) providing a liquid composition comprising calcium carbonate and rice starch in water;
    b) applying the liquid composition to pavement;
    c) allowing the water to evaporate to leave behind calcium carbonate adhered to the pavement by the rice starch.
17. The method of claim 16 wherein the liquid composition is applied by spraying.
18. The method of claim 16 wherein the adhered calcium carbonate is removed from the pavement by a low-pressure stream of water.
19. The method of claim 16 wherein the pavement comprises asphalt, concrete or brick.

* * * * *